(12) United States Patent
Sheng et al.

(10) Patent No.: US 11,792,345 B2
(45) Date of Patent: Oct. 17, 2023

(54) ELECTRONIC DEVICE AND DOCUMENT PROCESSING SYSTEM WITH COST SAVING FUNCTION

(71) Applicant: AVISION INC., Hsinchu (TW)

(72) Inventors: Shao-Lan Sheng, Hsinchu (TW); Chen-Chang Li, Hsinchu (TW); Yuan-Liang Jean, Hsinchu (TW)

(73) Assignee: AVISION INC., Hsinchu (TW)

(*) Notice: Subject to any disclaimer, the term of this patent is extended or adjusted under 35 U.S.C. 154(b) by 0 days.

(21) Appl. No.: 17/715,976

(22) Filed: Apr. 8, 2022

(65) Prior Publication Data

US 2022/0337716 A1    Oct. 20, 2022

(30) Foreign Application Priority Data

Apr. 16, 2021    (TW) .................................. 110113852

(51) Int. Cl.
*G06F 3/12*    (2006.01)
*H04N 1/00*    (2006.01)

(52) U.S. Cl.
CPC ....... *H04N 1/00803* (2013.01); *G06F 3/1203* (2013.01); *G06F 3/1229* (2013.01); *H04N 1/00689* (2013.01); *H04N 1/00694* (2013.01)

(58) Field of Classification Search
CPC .......... H04N 1/00803; H04N 1/00689; H04N 1/00692; G06F 3/1203; G06F 3/1229
See application file for complete search history.

(56) References Cited

U.S. PATENT DOCUMENTS

| | | | |
|---|---|---|---|
| 2009/0244586 A1 | 10/2009 | Sei | |
| 2009/0284767 A1 | 11/2009 | Harada | |
| 2010/0182618 A1* | 7/2010 | Akiyama | H04N 1/40 358/1.9 |
| 2011/0075187 A1* | 3/2011 | Imine | H04N 1/00442 358/1.14 |
| 2012/0120448 A1* | 5/2012 | Komaba | H04N 1/0083 358/1.15 |
| 2014/0365060 A1* | 12/2014 | Yamamoto | G05D 1/0016 701/23 |
| 2015/0070736 A1* | 3/2015 | Yoneyama | H04N 1/46 358/504 |
| 2017/0149999 A1 | 5/2017 | Jeevanantham et al. | |
| 2018/0260177 A1 | 9/2018 | Alberto | |
| 2021/0306473 A1* | 9/2021 | Inouye | H04N 1/00143 |
| 2022/0116510 A1* | 4/2022 | Umeizumi | G06F 3/1219 |

FOREIGN PATENT DOCUMENTS

| | | |
|---|---|---|
| CN | 101494709 A | 7/2009 |
| TW | 201242791 A | 11/2012 |
| TW | 201545533 A | 12/2015 |

* cited by examiner

*Primary Examiner* — Moustapha Diaby

(57) ABSTRACT

An electronic device and a document processing system both with cost saving function are disclosed. The electronic device performs a blank page counting process on a received first document file data containing blank pages, in order to generate cost information of non-blank pages and display it for reference. With the above electronic device, it is able to save the cost of outputting blank pages and avoid waste of paper to achieve the purpose of cost saving. The document processing system includes the above electronic device, which is connected to the document processing system via a network.

17 Claims, 4 Drawing Sheets

ELECTRONIC DEVICE AND DOCUMENT PROCESSING SYSTEM WITH COST SAVING FUNCTION

CROSS-REFERENCE TO RELATED APPLICATION

This non-provisional application claims priority under 35 U.S.C. § 119(a) on Patent Application No. 110113852 filed in Taiwan, R.O.C. on Apr. 16, 2021, the entire contents of which are hereby incorporated by reference.

BACKGROUND OF THE INVENTION

1. Field of the Invention

The present disclosure relates to an electronic device and a document processing system, and more particularly, to an electronic device and a document processing system both have a cost saving function.

2. Description of the Related Art

According to the currently available technical means, it is very popular to output a document file data using a printer. For example, a user who is conducting a study or a research would use a printer to output various document file data for reference, such as other people's research paper, articles published on some academic journals or professional literature.

For a document file that includes a relatively big data and accordingly has a large number of pages, there might be many blank pages due to the format of the document file data. These blank pages are mixed with other non-blank pages and are not easily found out. When the user uses a business machine to output the document file data, such as scan, print or fax it, the blank pages are also output. Since the basis of calculation of pages printed also includes the blank pages, it means the money the user has to pay for printing the output document file data includes all pages in the data, even though the blank pages do not contain any data.

However, from the standpoint of user, it is unreasonable to pay for the blank pages contained in the document file data, because the blank pages occupy relatively small space when being scanned and do not require any ink, toner powder or thermal printing process when being printed or faxed. Therefore, the money collected for the blank pages often causes confusion among users.

While most users hope to further save the cost expenditure and reduce waste of paper, the currently available technology just could not solve the problems and troubles of users that they have to pay additional cost when they use a printer to output their document file data containing blank pages.

When the user uses the printer to directly output the entire document file data, the unwanted blank pages are also printed along with other useful pages to increase the users' burden. It is therefore desirable and necessary to develop an improved way of solving this problem.

BRIEF SUMMARY OF THE INVENTION

An objective of the present disclosure is to provide an electronic device and a document processing system with cost saving function, so that a blank page counting process can be performed on a received document file data containing blank pages to generate cost information of non-blank pages for user's reference. Thus, a user can verify and save the cost of printing blank pages and avoid waste of paper to achieve the purpose of cost saving.

To achieve at least the above objective, a technical means adopted by the present disclosure is to provide an electronic device with cost saving function, which includes:
a data receiving module for receiving a first document file data containing blank pages;
an input module for receiving an instruction;
an output module;
a display module; and
a processing module being electrically connected to the data receiving module, the input module, the display module and the output module; and
wherein the processing module performs a blank page counting process on the first document file data to generate cost information of non-blank pages and instructs the display module to display the cost information of non-blank pages.

To achieve at least the above objective, another technical means adopted by the present disclosure is to provide a document processing system with cost saving function, which includes:
a cloud server at a remote location; and
an electronic device connected to the cloud server via a network; and
wherein the electronic device receives a first document file data containing blank pages and transmits the received first document file data to the cloud server; and the cloud server performs a blank page counting process on the first document file data to generate cost information of non-blank pages and transmits the latter to the electronic device.

To achieve at least the above objective, a further technical means adopted by the present disclosure is to provide a document processing system with cost saving function, which includes:
a cloud server at a remote location; and
an electronic device connected to the cloud server via a network; and
wherein the electronic device performs a blank page counting process on a received first document file data containing blank pages and transmits a processing result to the cloud server; and the cloud server generates cost information of non-blank pages according to the received processing result and transmits the cost information of non-blank pages to the electronic device.

In summary, the electronic device and the document processing system with cost saving function according to the present disclosure are able to perform a blank page counting process on a received first document file data containing blank pages to generate cost information of non-blank pages. Therefore, output cost of blank page can be saved and waste of paper can be avoided to achieve the purpose of cost saving.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1:
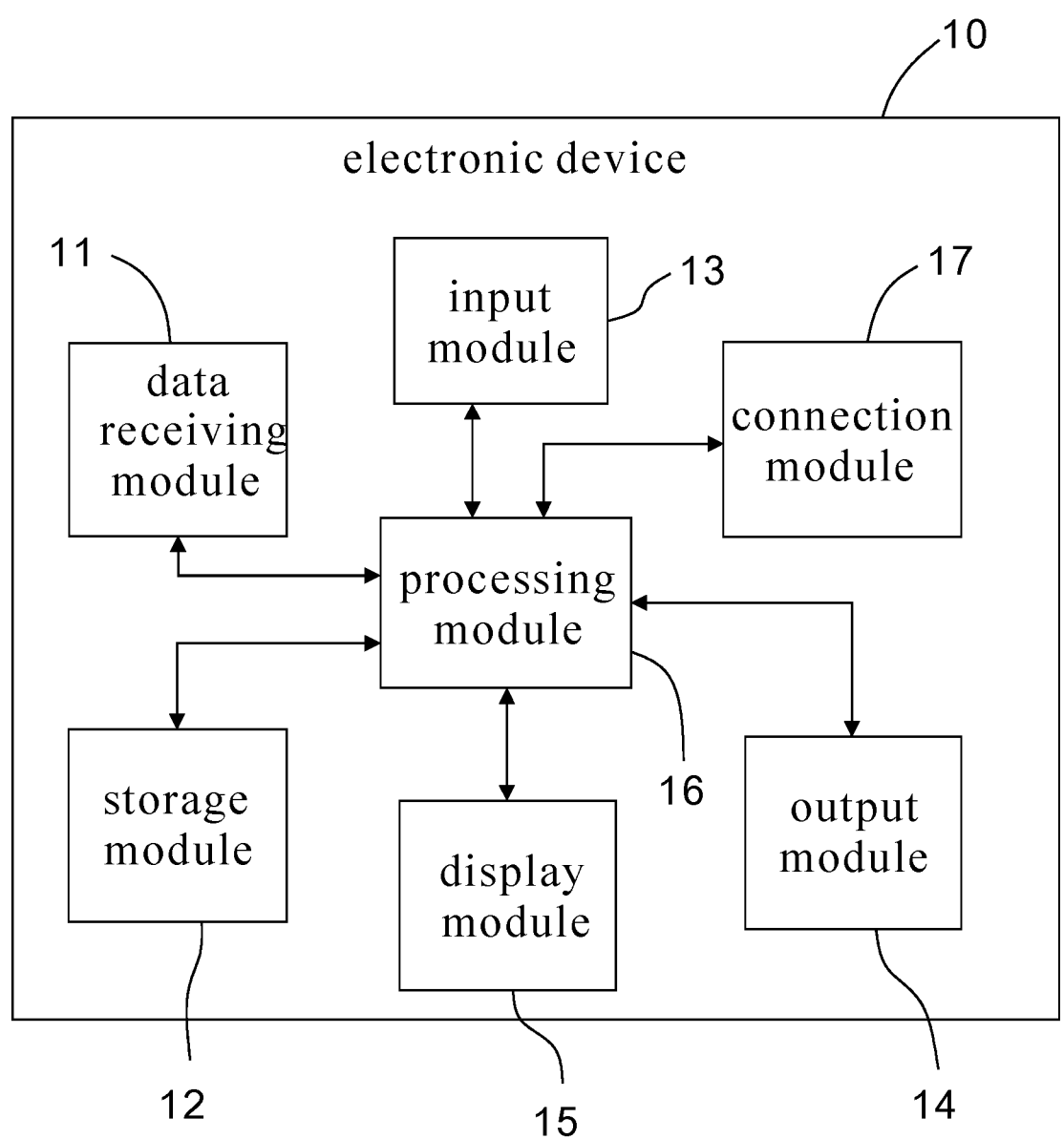
FIG. 1 is a configuration block diagram of an electronic device with cost saving function according to a first preferred embodiment of the present disclosure.

Please refer to FIG. 1, in which an electronic device 10 with cost saving function according to a first preferred embodiment of the present disclosure is shown. In the present disclosure, the electronic device 10 is connected via a network to a cloud server 20 at a remote location (not shown in FIG. 1). As shown, the electronic device 10 includes a data receiving module 11, a storage module 12, an input module 13, an output module 14, a display module 15 and a processing module 16. The processing module 16 is electrically connected to the data receiving module 11, the storage module 12, the input module 13, the output module 14 and the display module 15.

In the first preferred embodiment, the electronic device 10 can be a multi-function product/printer/peripheral (MFP), a computer device, a tablet computer or a mobile device.

In the first preferred embodiment, the data receiving module 11 is used to receive more than one document file data. More specifically, the data receiving module 11 can be a connection port and is connected to an external device via a transmission cable, in order to receive from the external device a first document file data containing blank pages. Or, the data receiving module 11 can be a wireless connection port to be wirelessly connected to an external device via some wireless transmission technology, such as Bluetooth or WiFi, in order to receive the first document file data from the external device. Or, the data receiving module 11 can be a document scanning mechanism for scanning hard copies of corresponding document files, in order to receive and get the first document file data. Further, the data receiving module 11 can be otherwise a network connection module for downloading the first document file data from a network.

In the first preferred embodiment, the storage module 12 is used to store all received data, relevant data to be processed, relevant data having been processed, data of relevant application programs, etc. More specifically, the storage module 12 can be a memory, including, but not limited to, non-volatile memory, such as Dynamic Random Access Memory (DRAM), flash memory, hard disk drive (HDD), and Solid-State Drive or Solid-State Disk (SSD).

In the first preferred embodiment, the input module 13 can be a physical keyboard for inputting corresponding instructions. Or, the input module 13 can be a touch display integrated into the display module 15.

In the first preferred embodiment, the output module 14 is used to output the file data after being processed. More specifically, the output module 14 can be a printing module for outputting the relevant data as paper-based data. Or, the output module 14 can be a connection port and is connected to a printer device via a transmission cable, so that relevant data is transmitted to the printer device and output as paper-base data. Or, the output module 14 can be a wireless connection port to be wirelessly connected to a printer device via some wireless transmission technology, such as Bluetooth or WiFi, in order to transmit relevant data to the printer device for outputting as paper-based data.

In the first preferred embodiment, the display module 15 is used to display relevant data and can be a computer monitor or a touch display. Further, the display module 15 can also be integrated with the input module 13 to form a touch display.

In the first preferred embodiment, the processing module 16 is used to process the received data and the data stored in the storage module 12. The processing module 16 can be a central processing unit (CPU).

Figure 2:
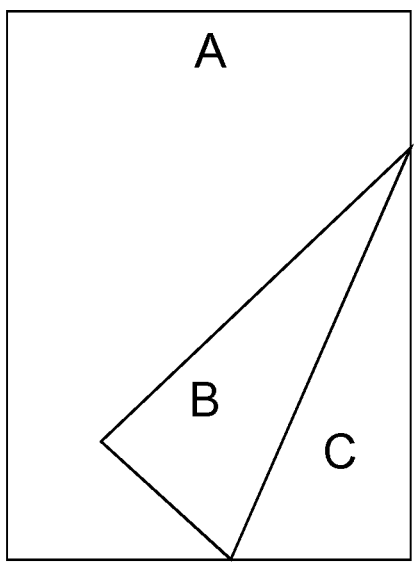
FIG. 2 is an example of one page in a document file data according to the present disclosure.

More specifically, according to the above description related to different modules, the data receiving module 11 is used to receive a first document file data containing blank pages as shown in FIG. 2. The processing module 16 stores the first document file data in the storage module 12 and performs a blank page counting process on the first document file data to generate cost information of non-blank pages. The processing module 16 further instructs the display module 15 to display the cost information of non-blank pages for reference.

With respect to the generation of the cost information of non-blank pages, it can be explained in two examples below. In the first example, the processing module 16 gets a total number of blank pages corresponding to the first document file data based on the blank page counting process. Then, the processing module 16 generates the cost information of non-blank pages according to total pages and total blank pages of the first document file data. For instance, the first document file data has total one hundred (100) pages and ten (10) blank pages. Subtract the 10 blank pages from the 100 total pages and get 90 non-blank pages. Multiply the number of non-blank pages, i.e. 90, by a page-based cost proportion to generate the cost information of non-blank pages. In this first example, the processing module 16 further performs a blank page removal process on the first document file data according to the total blank pages to generate a second document file data, in which all the blank pages are removed.

In the second example of generating the cost information of non-blank pages, the processing module 16 gets a total number of blank pages corresponding to the first document file data based on the blank page counting process. Then, the processing module 16 performs a blank page removal process on the first document file data according to the total blank pages to generate a second document file data, in which all the blank pages in the first document file data are removed, and generates the cost information of non-blank pages according to total pages of the second document file data. For instance, the first document file data has total one hundred (100) pages and ten (10) blank pages. The processing module 16 performs the blank page removal process based on the number of blank pages, i.e. 10, to remove all the blank pages in the first document file data and generate the second document file data having total 90 pages. The processing module 16 further multiplies the number of non-blank pages in the second document file data, i.e. 90, by a page-based cost proportion to generate the cost information of non-blank pages.

The processing module 16 further instructs the display module 15 to display the second document file data. When the processing module 16 receives via the input module 13 a document processing instruction, the processing module 16 instructs the output module 14 to output the second document file data according to the received document processing instruction. More specifically, when a payment is made corresponding to the cost information of non-blank pages, the input module 13 will receive the document processing instruction. The payment can be made by the user to a cashier directly, and when the cashier verifies the payment has been made by the user according to the cost information of non-blank pages, the document processing instruction is input to the electronic device 10 via the input module 13. In other words, the input module 13 receives the document processing instruction.

According to a variation of the first preferred embodiment, the electronic device 10 further includes a connection module 17 electrically connected to the processing module 16. The connection module 17 has a network protocol and is connected to a remote location via a network for information exchange. More specifically, the connection module 17 can be a wireless network module, including, but not limited to, a WiFi module or a communication module, such as a 2G, a 3G, a 4G and a 5G or a higher level communication module. Or, the connection module 17 can be a cabled network module, including but not limited to a network card.

The processing module 16 transmits the second document file data and the cost information of non-blank pages to a remote location via the connection module 17. When the processing module 16 receives the document processing instruction fed back from the remote location via the connection module 17, the processing module 16 instructs the output module 14 to output the second document file data. Wherein, the document processing instruction received by the connection module 17 is sent by the remote location when the latter accepts the payment made corresponding to the cost information of non-blank pages.

Figure 3:
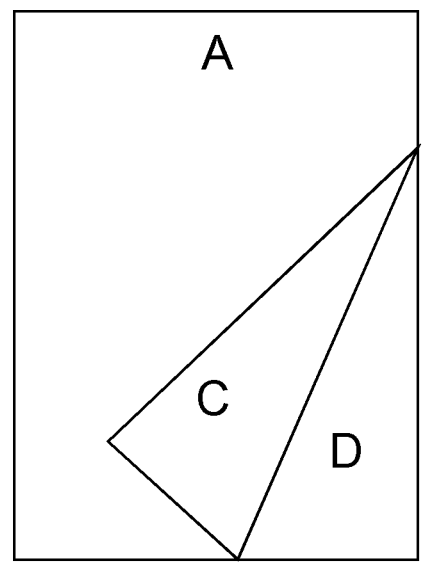
FIG. 3 is an example of another page in the document file data according to the present disclosure.

With respect to the removal of blank pages, please refer to FIGS. 2 and 3. The first document file data includes a plurality of pages, such as page A, page B, page C, page D to page N. It is understood the pages A, B, C and D are only illustrative and not intended to restrict the present disclosure in any way. In the first preferred embodiment, a first manner of removing blank pages from the first document file data is explained below. First, the processing module 16 performs an image detection of the first document file data page by page from page A to page N to obtain a plurality of image characteristic values for each page. Then, the processing module 16 performs an image characteristic calculation on the pages one by one based on the image characteristic values of each page, so as to generate a characteristic calculated value corresponding to each of the pages. In other words, every page has a corresponding characteristic calculated value. The processing module 16 further determines page by page whether the characteristic calculated value of each page satisfies a first threshold range value. If yes, it is determined the page is a blank page. If not, the processing module further determines whether the characteristic calculated value of each page satisfies a second threshold range value. If yes, it is determined the page is a non-blank page.

Please refer to FIGS. 2 and 3. As shown, after each of the pages of the first document file data has been determined to be a blank page or a non-black page, for example, it is determined pages A, C and D are respectively a non-black pages while page B is a blank page, the processing module 16 will delete page B from the first document file data and set page C directly behind page A. For example, in the case the first document file data is present in the form of a double-side printed document, the next page after the deletion of page B, i.e. page C, is set directly behind page A. In this manner, the removal of the blank pages and the successive arrangement of all pages are completed to correspondingly generate and store the second document file data.

In the first preferred embodiment, the image characteristic value is an image grayscale value. The image characteristic calculation is to calculate an average image grayscale value. More specifically, in the image characteristic calculation, a plurality of image grayscale values of each page are summed up and take an average thereof to thereby get the average image grayscale value for each page. The characteristic calculated value is corresponding to the average grayscale value of each page. The first threshold range value is a grayscale range value larger than or equal to 200 and smaller than or equal to 255; and the second threshold range value is a grayscale range value smaller than 200 and larger than or equal to zero.

More specifically, the processing module 16 detects page by page to get a plurality of image grayscale values of each page and then, calculate page by page a corresponding average grayscale value of each page. Finally, the processing module 16 determines whether the average grayscale value of each page satisfies the first threshold range value or the second threshold range value and determines accordingly whether the corresponding page is a blank page or a non-blank page. It is to be noted that when the average grayscale value of each page is determined as not satisfying the first threshold range value, it usually satisfies the second threshold range value, and vice versa.

In the first preferred embodiment, a second manner of removing blank pages from the first document file data is explained below. First, the processing module 16 performs an image detection of the first document file data containing blank pages page by page to obtain a plurality of image characteristic values for each page. Then, the processing module 16 performs an image characteristic distribution statistical calculation on the first document file data page by page, so as to get a statistics of numbers of identical and different image characteristic values for each page. In other words, the processing module 16 gets a statistics of the number of identical image characteristic value and the number of different image characteristic values in each page. The processing module 16 further determines page by page whether the number of the image characteristic values of each page satisfying the first threshold range value also satisfies a first number range value. If yes, the corresponding page is determined as a blank page. Or, if not, the processing module 16 further determines whether the number of the image characteristic values of each page satisfying the second threshold range value also satisfies a second number range value. If yes, the corresponding page is determined as a non-blank page. In this manner, every page is determined as a blank page or a non-blank page. In the first preferred embodiment, the second manner of removing blank pages from the first document file data provides upgraded accuracy in determining whether a page is a blank page or a non-blank page.

A user may select to use the first or the second manner according to actual need. Alternatively, the user may select to use the first manner to make a quick determination firstly and then use the second manner to make a subsidiary determination to further increase the accuracy of the determination. In other words, the user may compare the determination result from the second manner with the determination result from the first manner. If the two results are the same, the blank pages or the non-blank pages found in the first manner is kept for use. Or, if the results from the two manners are different, any blank page or non-blank page found in the first manner but different from that found in the second manner are replaced by the result from the second manner.

In the first preferred embodiment, the cost information of non-blank pages includes a payment authentication code, payment amount information, and number of pages information. The payment authentication code can be a QR code or a linear barcode.

The user may use a mobile device to execute a payment procedure according to the cost information of non-blank pages displayed by the display module 15. In this case, the mobile device is connected to the cloud server 20 to make the payment. Alternatively, the user may connect the electronic device 10 to a payment webpage provided by the cloud server 20 to make the payment according to the cost information of non-blank pages. When the user makes the payment and the cloud server 20 accepts the payment completed by the user corresponding to the cost information of non-blank pages, the cloud server 20 transmits the document processing instruction to the electronic device 10, so that the electronic device 10 can output the second document file data.

In the first preferred embodiment, when the processing module 16 receives the document processing instruction, it instructs the output module 14 to output the second document file data. Wherein, the output module 14 is instructed to output the second document file data as paper-based data, or to output the second document file data to a printer device connected thereto for the printer device to output the paper-based data.

Figure 4:
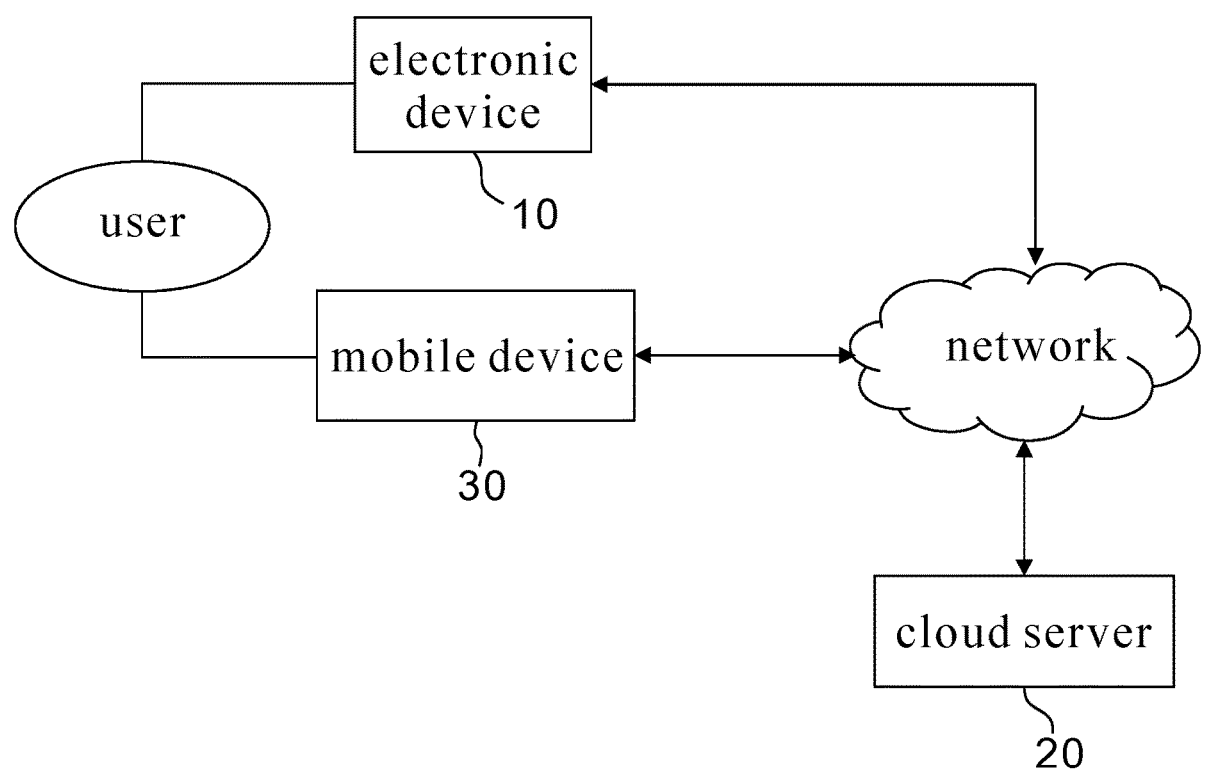
FIG. 4 is a configuration block diagram showing the connection of an electronic device to a cloud server and a mobile device in a document processing system with cost saving function according to a second preferred embodiment.
Figure 5:
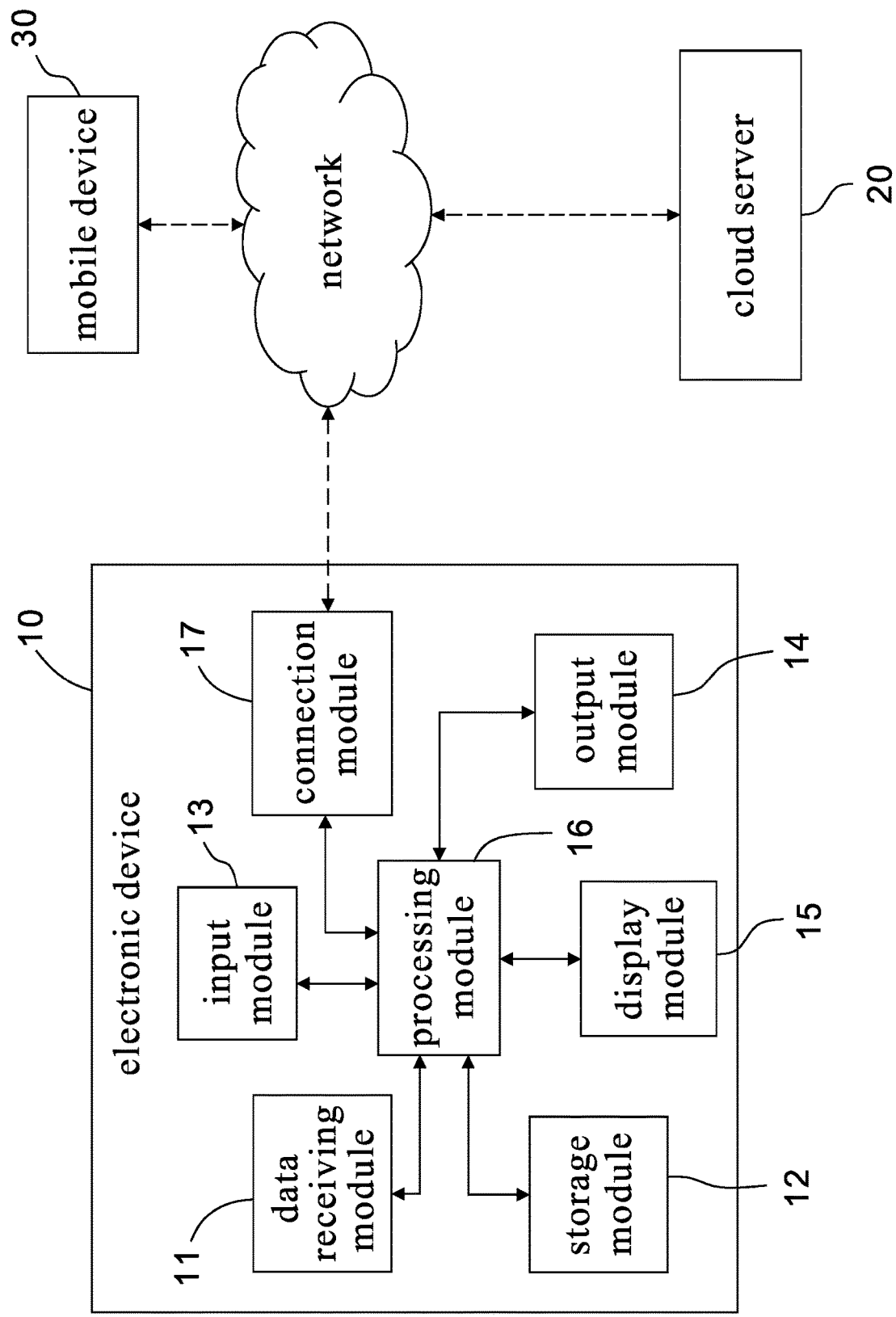
FIG. 5 is a conceptual block diagram of the document processing system with cost saving function of FIG. 4 showing an embodied configuration of the electronic device and the connection of the electronic device to the cloud server and the mobile device.

Please refer to FIGS. 4 and 5, in which a document processing system with cost saving function according to a second preferred embodiment of the present disclosure is shown. The document processing system includes the electronic device 10 as described in the first preferred embodiment, a cloud server 20 at a remote location, and a mobile device 30. The mobile device 30 is connected to the cloud server 20 via a network. The second preferred embodiment is generally similar to the first one, except that the first document file data received by the electronic device 10 in the second preferred embodiment is directly transmitted to the cloud server 20, and the cloud server 20 generates the cost information of non-blank pages according to the first document file data and transmits the cost information of non-blank pages back to the electronic device 10.

In an example, the cloud server 20 performs a blank page counting process on the first document file data to obtain a total number of blank pages. Then, the cloud server 20 generates the cost information of non-blank pages according to total pages and total blank pages in the first documentary file data. Further, the cloud server 20 performs a blank pages removal process on the first document file data according to the number of the blank pages to generate a second document file data that has not any blank page and is transmitted to the electronic device 10.

In another example, the cloud server 20 performs a blank page counting process on the first document file data to obtain a total number of blank pages. Then, the cloud server 20 performs a blank pages removal process on the first document file data according to the number of the blank pages to generate a second document file data that has not any blank page. Further, the cloud server 20 generates the cost information of non-blank pages based on the second document file data. Finally, the cloud server 20 transmits the cost information of non-blank pages and the second document file data back to the electronic device 10.

The cost information of non-blank pages is displayed on the electronic device 10. The user uses the mobile device 30 to execute a payment procedure according to the cost information of non-blank pages. When the cloud server 20 accepts the payment made by the user corresponding to the cost information of non-blank pages via the mobile device 30, it transmits the document processing instruction to the electronic device 10, so that the electronic device 10 follows the document processing instruction to output the second document file data.

A document processing system according to a third preferred embodiment of the present disclosure is also disclosed. Please refer to FIGS. 4 and 5 again. The third preferred embodiment is generally similar to the second one, except that, in a first example of the third preferred embodiment, it is the electronic device 10 that performs the blank pages counting process on the received first document file data and transmits a processing result to the cloud server 20. The cloud server 20 generates the cost information of non-blank pages according to the received processing result and transmits the cost information of non-blank pages to the electrode device 10. The electronic device 10 further performs the blank page removal process on the first document file data according to the number of blank pages shown in the processing result, so as to generate the second document file data. In a second example of the third preferred embodiment, the electronic device 10 performs the blank page removal process on the first document file data according to the number of blank pages shown in the processing result of the blank page counting process, so as to generate the second document file data and transmit the same to the cloud server 20. Then, the cloud server 20 generates the cost information of non-blank pages according to the second document file data and transmits the cost information of non-blank pages to the electronic device 10.

According to the cost information of non-blank pages shown on the electronic device 10, the user uses the mobile device 30 to make payment. The cloud server 20 transmits the document processing instruction to the electronic device 10 when the user completes the payment corresponding to the cost information of non-blank pages, so that the electronic device 10 outputs the second document file data according to the document processing instruction.

In summary, the electronic device and the document processing system with cost saving function according to the present disclosure is capable of performing a blank page counting process on a first document file data containing blank pages to generate cost information of non-blank pages for a user's reference. Thus, the user can conveniently verify the number of blank pages and save the cost and avoid wasting paper for outputting such blank pages to achieve the purpose of cost saving. Further, a blank page removal process is performed on the first document file data to generate a second document file data without any blank page, which will be output via the electronic device 10 after payment is made for it. With these arrangements, the user no longer needs to take additional time to sort the output files for any blank page, and accordingly, paper for printing the blank pages can be saved, time for organizing the files can be reduced and work efficiency can be upgraded to save a lot of costs.

While the present disclosure has been described by means of specific embodiments, numerous modifications and variations could be made thereto by those skilled in the art without departing from the scope and spirit of the present disclosure set forth in the claims.

What is claimed is:

1. An electronic device with cost saving function, comprising:
    a data receiving module for receiving a first document file data containing blank pages;
    an input module for receiving an instruction;
    an output module;
    a display module; and
    a processing module being electrically connected to the data receiving module, the input module, the display module and the output module; and
    wherein the processing module performs a blank page counting process on the first document file data to generate cost information of non-blank pages base on one characteristic calculated value of each page of the first document file data and instructs the display module to display the cost information of non-blank pages;
    wherein the processing module performs an image detection of the first document file data page by page to obtain a plurality of image characteristic values of each page;
    the processing module performing an image characteristic calculation on the pages one by one based on the image characteristic values of each page to generate a characteristic calculated value corresponding to each of the pages; and
    the processing module determining page by page whether the characteristic calculated value of each page satisfies a first threshold range value; if yes, the processing module determining the page is a blank page; or if not, the processing module further determining whether the characteristic calculated value of each page satisfies a second threshold range value; and if yes, the processing module determining the page is a non-blank page.

2. The electronic device with cost saving function according to claim 1, wherein the processing module performs the blank page counting process to obtain a total number of blank pages and generates the cost information of non-blank pages according to total pages and total blank pages of the first document file data.

3. The electronic device with cost saving function according to claim 2, wherein the processing module performs a blank page removal process on the first document file data according to the number of blank pages to generate a second document file data, in which all the blank pages are removed.

4. The electronic device with cost saving function according to claim 3, wherein when the processing module receives a document processing instruction via the input module, the processing module instructs the output module to output the second document file data.

5. The electronic device with cost saving function according to claim 4, further comprising a connection module electrically connected to the processing module and connected to a remote location via a network; the processing module transmitting the second document file data and the cost information of non blank pages to the remote location via the connection module; and the processing module receiving the document processing instruction sent back by the remote location via the connection module and instructing the output module to output the second document file data.

6. The electronic device with cost saving function according to claim 1, wherein the processing module performs the blank page counting process to obtain a total number of blank pages, and performs a blank page removal process on the first document file data according to the number of blank pages to generate a second document file data, in which all the blank pages are removed, and then generates the cost information of non-blank pages according to the second document file data.

7. The electronic device with cost saving function according to claim 1, wherein
    the processing module performing an image characteristic distribution statistical calculation on the first document file data page by page to get a statistics of number of identical image characteristic value and number of different image characteristic values in each page; and
    the processing module further determining page by page whether the number of the image characteristic values of each page satisfying the first threshold range value also satisfies a first number range value; if yes, the processing module determining the corresponding page is a blank page; or, if not, the processing module further determining whether the number of the image characteristic values of each page satisfying the second threshold range value also satisfies a second number range value; and if yes, processing module determining the corresponding page is a non-blank page.

8. A document processing system with cost saving function, comprising:
    a cloud server at a remote location; and
    an electronic device being connected to the cloud server via a network; and
    wherein the electronic device receives a first document file data containing blank pages and transmits the received first document file data to the cloud server; and the cloud server performs a blank page counting process on the first document file data base on one characteristic calculated value of each page of the received first document file data to generate cost information of non-blank pages and transmits the latter to the electronic device;
    wherein the cloud server performs an image detection of the first document file data page by page to obtain a plurality of image characteristic values of each page;
    the cloud server performing an image characteristic calculation on the pages one by one based on the image characteristic values of each page to generate a characteristic calculated value corresponding to each of the pages; and
    the cloud server determining page by page whether the characteristic calculated value of each page satisfies a first threshold range value; if yes, the cloud server determining the page is a blank page; or if not, the cloud server further determining whether the characteristic calculated value of each page satisfies a second threshold range value; and if yes, the cloud server determining the page is a non-blank page.

9. The document processing system with cost saving function according to claim 8, wherein the cloud server performs the blank page counting process to obtain a total number of blank pages and generates the cost information of non-blank pages according to total pages and total blank pages of the first document file data.

10. The document processing system with cost saving function according to claim 9, wherein the cloud server performs a blank page removal process on the first document file data according to the number of blank pages to generate a second document file data, in which all the blank pages are removed, and transmits the second document file data to the electronic device.

11. The document processing system with cost saving function according to claim 10, wherein when the cloud server accepts a payment made corresponding to the cost information of non-blank pages, the cloud server transmits a document processing instruction to the electronic device to instruct the electronic device to output the second document file data.

12. The document processing system with cost saving function according to claim 11, further comprising a mobile device connected to the cloud server via the network; the mobile device performing a payment procedure according to the cost information of non-blank pages; and the cloud server, after accepting the payment made by the mobile device according to the cost information of nonblank pages, transmitting the document processing instruction to the electronic device.

13. The document processing system with cost saving function according to claim 8, wherein the cloud server performs the blank page counting process to obtain a total number of blank pages; the cloud server performing a blank page removal process on the first document file data according to the number of blank pages to generate a second document file data, in which all the blank pages are removed, and generating the cost information of non-blank pages according to the second document file data; and then the cloud server transmitting the cost information of non-blank pages and the second document file data to the electronic device.

14. The document processing system with cost saving function according to claim 8, wherein
the cloud server performing an image characteristic distribution statistical calculation on the first document file data page by page to get a statistics of number of identical image characteristic value and number of different image characteristic values in each page; and
the cloud server further determining page by page whether the number of the image characteristic values of each page satisfying the first threshold range value also satisfies a first number range value; if yes, the cloud server determining the corresponding page is a blank page; or, if not, the cloud server further determining whether the number of the image characteristic values of each page satisfying the second threshold range value also satisfies a second number range value; and if yes, cloud server determining the corresponding page is a non-blank page.

15. A document processing system with cost saving function, comprising:
a cloud server at a remote location; and
an electronic device connected to the cloud server via a network; and
wherein the electronic device performs a blank page counting process on a received first document file data containing blank pages base on one characteristic calculated value of each page of the received first document file data and transmits a processing result to the cloud server; and the cloud server generates cost information of non-blank pages according to the received processing result and transmits the cost information of non-blank pages to the electronic device;
wherein the electronic device performs an image detection of the first document file data page by page to obtain a plurality of image characteristic values of each page;
the electronic device performing an image characteristic calculation on the pages one by one based on the image characteristic values of each page to generate a characteristic calculated value corresponding to each of the pages; and
the electronic device determining page by page whether the characteristic calculated value of each page satisfies a first threshold range value; if yes, the electronic device determining the page is a blank page; or if not, the electronic device further determining whether the characteristic calculated value of each page satisfies a second threshold range value; and if yes, the electronic device determining the page is a non-blank page.

16. The document processing system with cost saving function according to claim 15, wherein the cloud server generates the cost information of non-blank pages according to total pages and total blank pages of the first document file data shown in the received processing result;
wherein the cloud server performs a blank page removal process on the first document file data according to a total number of blank pages to generate a second document file data, in which all the blank pages are removed;
wherein when the cloud server accepts a payment made corresponding to the cost information of non-blank pages, the cloud server transmits a document processing instruction to the electronic device to instruct the electronic device to output the second document file data; and
the document processing system further comprising a mobile device connected to the cloud server via the network; the mobile device performing a payment procedure according to the cost information of non-blank pages; and the cloud server, after accepting payment made by the mobile device according to the cost information of non-blank pages, transmitting the document processing instruction to the electronic device.

17. The document processing system with cost saving function according to claim 16, wherein the electronic device performs a blank page removal process on the first document file data according to a total number of blank pages shown in the processing result to generate a second document file data, in which all the blank pages are removed, and then transmits the second document file data to the cloud server; and the electronic device receiving the cost information of non-blank pages transmitted by the cloud server according to the second document file data.

* * * * *